(12) United States Patent
Wood et al.

(10) Patent No.: US 9,167,437 B2
(45) Date of Patent: Oct. 20, 2015

(54) GATHERING DATA ON CELLULAR DATA COMMUNICATION CHARACTERISTICS

(75) Inventors: Steven Wood, Boise, ID (US); David Alan Johnson, Boise, ID (US)

(73) Assignee: CRADLEPOINT, INC., Boise, ID (US)

( * ) Notice: Subject to any disclaimer, the term of this patent is extended or adjusted under 35 U.S.C. 154(b) by 156 days.

(21) Appl. No.: 12/957,139

(22) Filed: Nov. 30, 2010

(65) Prior Publication Data

US 2011/0292822 A1 Dec. 1, 2011

Related U.S. Application Data

(60) Provisional application No. 61/266,913, filed on Dec. 4, 2009.

(51) Int. Cl.
*H04W 24/00* (2009.01)
*H04W 80/04* (2009.01)
*H04L 12/26* (2006.01)
*H04L 12/701* (2013.01)

(52) U.S. Cl.
CPC .............. *H04W 24/00* (2013.01); *H04L 43/08* (2013.01); *H04L 45/00* (2013.01)

(58) Field of Classification Search
USPC ............ 370/252, 395.52, 250, 222, 229, 241, 370/230, 235, 232, 328, 338, 389; 709/224
See application file for complete search history.

(56) References Cited

U.S. PATENT DOCUMENTS

| | | | | |
|---|---|---|---|---|
| 8,239,527 | B2* | 8/2012 | Maiocco et al. | 709/224 |
| 2002/0133463 | A1* | 9/2002 | Curtis et al. | 705/50 |
| 2002/0184393 | A1* | 12/2002 | Leddy et al. | 709/250 |
| 2004/0006620 | A1* | 1/2004 | Howard et al. | 709/224 |
| 2005/0265321 | A1* | 12/2005 | Rappaport et al. | 370/352 |
| 2008/0049630 | A1* | 2/2008 | Kozisek et al. | 370/250 |
| 2008/0095173 | A1* | 4/2008 | Bugenhagen | 370/395.21 |
| 2008/0313327 | A1* | 12/2008 | Sewall et al. | 709/224 |
| 2009/0030942 | A1* | 1/2009 | Jiang | 707/104.1 |
| 2009/0064255 | A1* | 3/2009 | Jiang et al. | 725/118 |
| 2009/0147692 | A1* | 6/2009 | Hasan et al. | 370/252 |
| 2009/0285102 | A1* | 11/2009 | Daily | 370/241 |
| 2009/0292824 | A1* | 11/2009 | Marashi et al. | 709/247 |
| 2011/0117909 | A1* | 5/2011 | Cao et al. | 455/423 |
| 2011/0151864 | A1* | 6/2011 | Byun et al. | 455/426.1 |
| 2011/0228679 | A1* | 9/2011 | Varma et al. | 370/241 |

* cited by examiner

*Primary Examiner* — Andrew Lee
(74) *Attorney, Agent, or Firm* — Parsons Behle & Latimer

(57) ABSTRACT

A method for collecting data that can be used to characterize the performance of a wireless communications system is disclosed. The method comprises determining data characterizing a wireless data communication that occurs between an internet service provider and a data collection system. The data collection system comprises a data exchanger and a routing device through which communications can be routed between client devices and an internet via the internet service provider. The routing device includes a memory. The routing device collects the data and stores the data in the memory of the routing device. A system for collecting data is also disclosed.

29 Claims, 4 Drawing Sheets

GATHERING DATA ON CELLULAR DATA COMMUNICATION CHARACTERISTICS

RELATED DISCLOSURES

This application claims priority to U.S. Provisional Application No. 61/266,913, filed Dec. 4, 2009, the disclosure of which is hereby incorporated by reference in its entirety.

BACKGROUND

Routers allow client devices in a local area network (LAN) to access a wide area network (WAN). Connections between client devices and the router may be wired or wireless. Similarly, connections between the router and the Wide Area Network may be wired or wireless. Wireless connections to the WAN may be through a cellular network.

It is well known that the speed of data transmission between end user devices in a network and an internet service provider can vary depending on such things as the strength of wireless connections, router speeds, and other factors. This may be particularly true where cellular networks provide a link between the end user devices and an internet service provider because cellular coverage can vary widely with geographical location. Further, because end user devices that rely on cellular networks are often mobile, coverage gaps within a cellular network can cause a loss of internet connection as the user is traveling within the network.

The ability for internet service providers and cellular network providers to gather data on cellular data communication characteristics can allow service providers to determine what geographical areas of a network need to be upgraded in order to provide more complete coverage. It can also potentially alert them to data transmission problems and aid in locating the cause of such problems within what would generally be considered a good coverage area. Therefore, improvements in cellular data gathering techniques are very desirable in the art.

SUMMARY

The present disclosure is directed to a method for collecting data that can be used to characterize the performance of a wireless communications system. The method comprises determining data characterizing a wireless data communication that occurs between an internet service provider and a data collection system. The data collection system comprises a data exchanger and a routing device through which communications can be routed between client devices and an internet via the internet service provider. The routing device includes a memory. The routing device collects the data and stores the data in the memory of the routing device.

Another embodiment of the present disclosure is directed to a system for collecting data that can be used to characterize the performance of a wireless communications system. The system comprises: one or more client devices; a data exchanger configured to provide a remote link to an internet service provider; and a routing device comprising a memory and being configured to route communications between the one or more client devices and an internet via the data exchanger. At least one of the data exchanger and the routing device is configured to determine data characterizing a wireless data communication that occurs between the data collection system and an internet service provider. The routing device is configured to collect the data and store the data in the memory of the routing device.

Yet another embodiment of the present disclosure is directed to a router. The router comprises: a local network interface configured to allow communication with one or more client devices; a data transfer device enabling the exchange of network communications between the router and an internet service provider; and routing services configured to receive routable communications from either the local network interface or the data transfer device and to direct the routable communications to an intended destination. The router is configured to collect and store data characterizing a wireless data communication that occurs between a data collection system and an internet service provider.

Still another embodiment of the present disclosure is directed to a computer readable medium. The computer readable medium has computer executable instructions for collecting data characterizing a wireless data communication that occurs between a data collection system and an internet service provider; storing the data; and periodically sending information regarding the correlated data to a remote server via the internet service provider.

Figure 1:
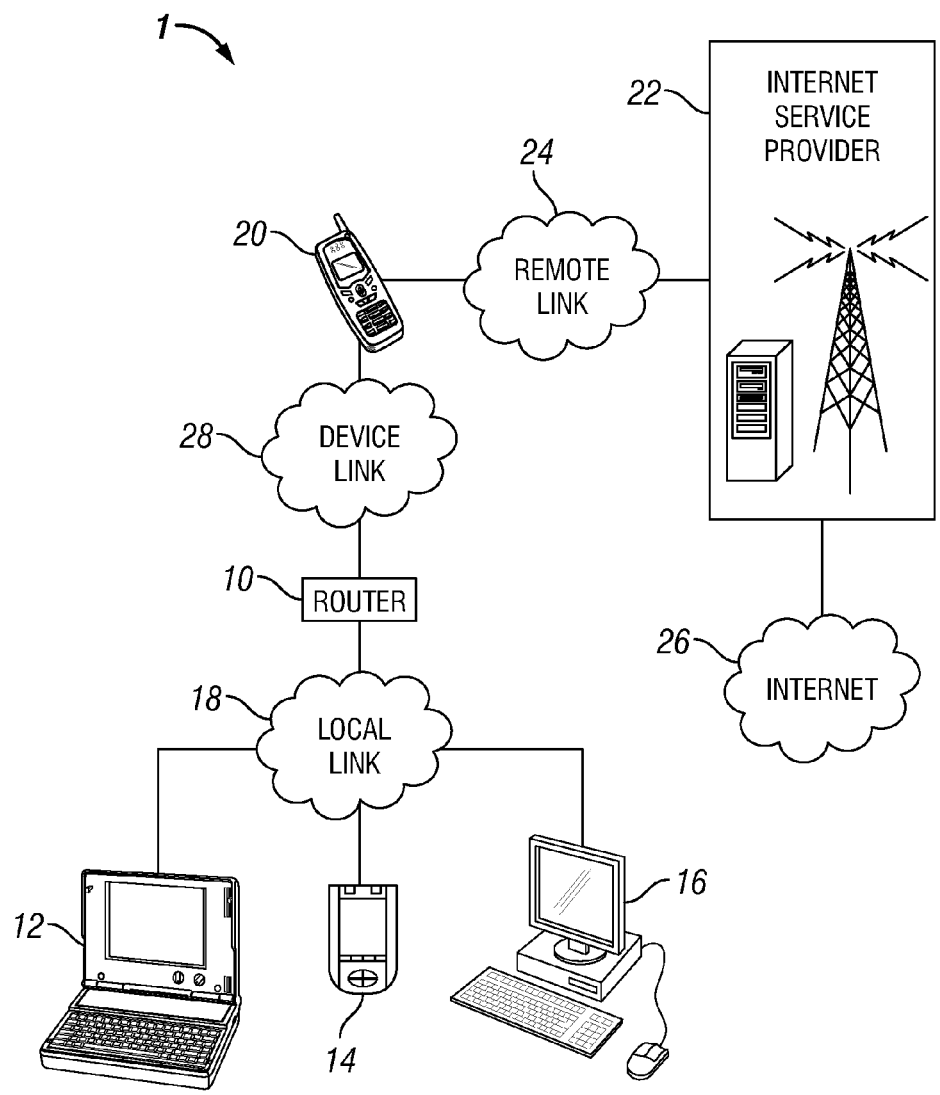
FIGS. 1 and 2 illustrate exemplary block diagrams of environments in which embodiments of the present disclosure can be implemented.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Embodiments of the present disclosure allow a user to connect to the internet using a device such as an internet enabled cellular telephone, wireless modem or other cellular data access device. With a router, multiple users of computing devices such as lap top computers, desktop computers, and personal digital assistants (PDAs) can access the internet simultaneously through the data capabilities of the cellular data access device. The combination of the router and the cellular data access device can provide an internet-connected local wireless network anywhere that there is cellular data coverage.

FIG. 1 illustrates exemplary environment 1 in which various embodiments of the present disclosure may be implemented. Environment 1 includes router 10 and client devices 12, 14, and 16 and local link 18. Router 10, discussed in more detail later, represents generally a device capable of routing network communications between client devices 12, 14, and 16 and internet 26 via a data exchanger 20. Client devices 12, 14, and 16 represent generally any computing devices capable of communicating with router 10.

Local link 18 interconnects router 10 and client devices 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally any combination of hardware and/or programming that can be utilized by router 10 to connect to a remote network such as the internet. While illustrated as an internet enabled cellular telephone, data exchanger 20 is not so limited. Other examples include but are not limited to DSL modems, cable modems and cellular data modems.

Service provider 22 represents generally any infrastructure configured to provide internet related data services to subscribers such as an owner of data exchanger 20. For example, where data exchanger 20 is an internet enabled cellular telephone or cellular modem, service provider 22 may be a cellular telephone service provider capable of providing voice and data services to subscribers allowing access to internet 26. Where data exchanger 20 is a DSL or cable modem, service provider 22 may be a more traditional internet service provider (ISP) providing data access to internet 26 through wired means.

Remote link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22. Remote link 24 may represent an intranet, an internet, or a combination of both.

In the embodiment illustrated in FIG. 1, device link 28 interconnects router 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical connection such as a USB cable or direct connection between USB connectors, or radio waves carrying Bluetooth communications.

Figure 2:
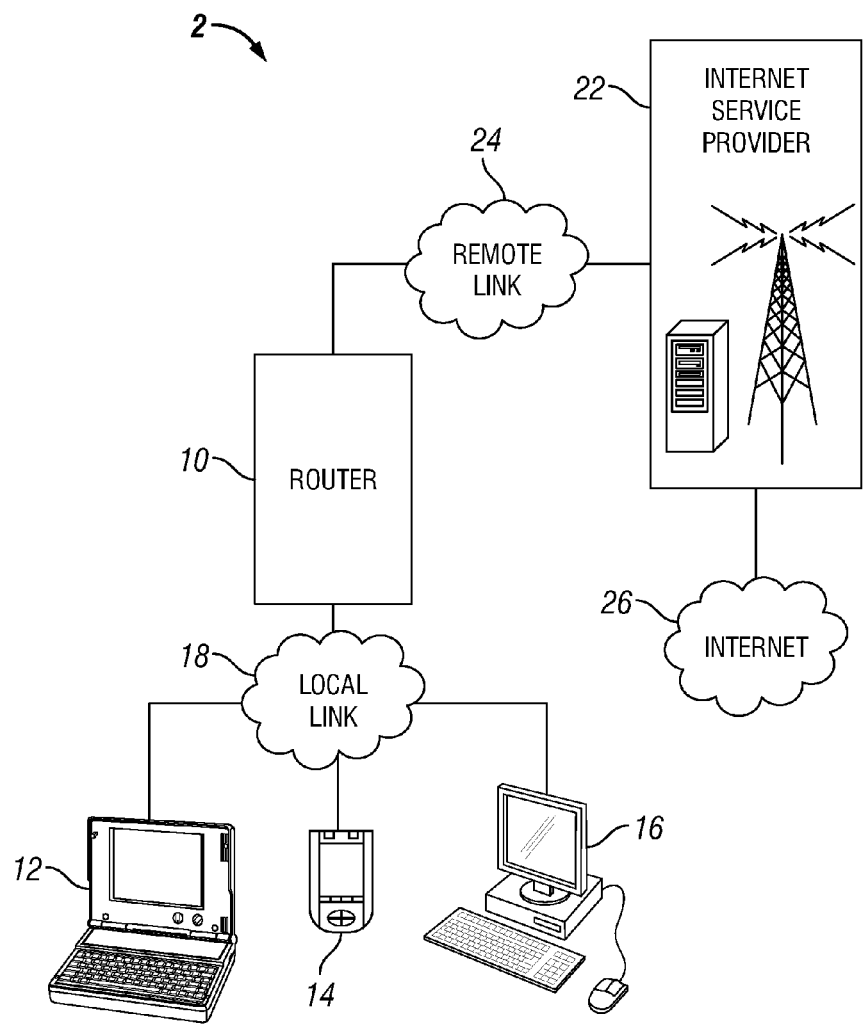

FIG. 2 illustrates another exemplary environment 2 in which various embodiments of the present disclosure may be implemented. In the example of FIG. 2, the data exchanger (not shown) and router 10 are incorporated within the same device. Device link 28 (shown in FIG. 1) is eliminated and replaced with internal connections. In such a scenario, the data exchanger may take the form of a separate device card that can be inserted into a slot provided by router 10, or otherwise connected to the router 10 through an I/O port. Alternatively, the data exchanger may be fully integrated into router 10.

Figure 3:
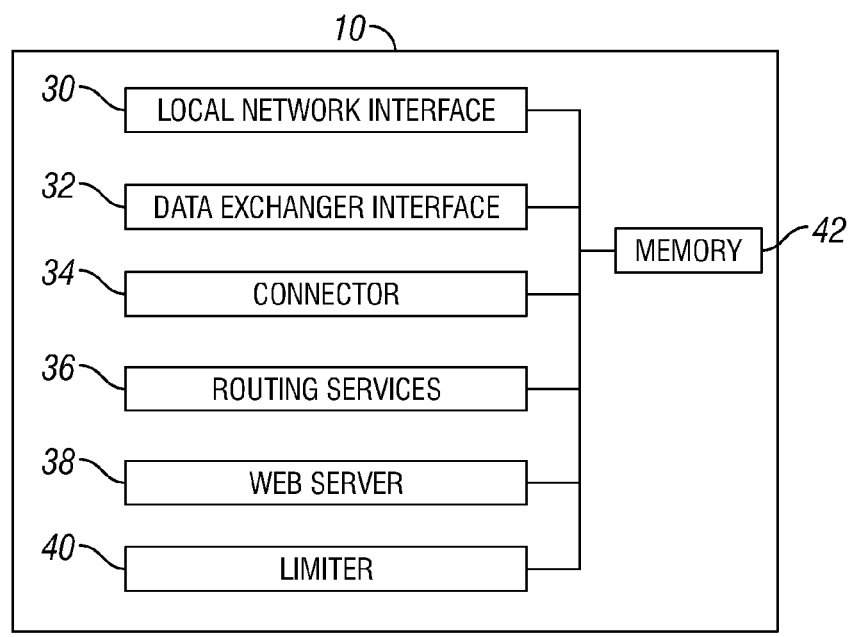
FIG. 3 is a block diagram showing physical and logical components of a router.

FIG. 3 is a block diagram illustrating exemplary physical and logical components of router 10. As described above, router 10 represents generally any combination of hardware and/or programming capable of functioning as a router for directing network communications between client devices on the local network, or between client devices and the internet via a data exchanger such as an internet enabled cellular telephone, cellular modem, DSL modem, or cable modem. Router 10 can include a local memory 42, which can be used to store data. Memory 4 can be any suitable type of memory, such as, for example, a hard drive, random access memory (RAM), flash memory, or an erasable programmable read-only memory.

In the example of FIG. 3, router 10 includes local network interface 30 and data exchanger interface 32. Local network interface 30 represents generally any combination of hardware and/or program instructions capable of supplying a communication interface between router 10 and client devices 12, 14, and 16 shown in FIGS. 1 and 2. Data exchanger interface 32 represents any combination of hardware and/or programming enabling data to be communicated between router 10 and a data exchanger 20 shown in FIG. 1. For example, interfaces 30 and 32 may include a transceiver operable to exchange network communications utilizing a wireless protocol such as ultrawideband (UWB), Bluetooth, or 802.11. Alternatively, interfaces 30 and 32 may include physical ports or other physical connection points enabling wired communication.

Router 10 also includes routing services 36 and web server 38. Routing services 36 represents generally any combination of hardware and/or programming for routing network communication received through local network interface 30 to be transmitted by data exchanger 20 to internet 26. Routing services 36 is also responsible for routing inbound network communications received from internet 26 and directed via network interface 30 to a specified client device 12, 14, or 16. Outbound and inbound network communications, for example can be IP (internet protocol) packets directed to a target on internet 26 or to a particular network device 12, 14, or 16 on a local area network.

Web server 38 represents generally any combination of hardware and/or programming capable of serving interfaces such as web pages to client devices 12, 14, and 16. Such web pages may include web pages that when displayed by a network device allows a user to provide or otherwise select settings related to the operation of router 10.

Router 10 can optionally include connector 34. Connector 34 represents generally any combination of hardware and/or programming for sending a signal to data exchanger 20 to establish a data connection with service provider 22 so that access can be made to internet 26. For example, where a data exchanger 20 is a cellular telephone, connector 34 may send a signal causing the cellular telephone to establish such a data link with service provider 22. In an embodiment, the router does not include a connector 34. In an embodiment, the hardware and/or programming for establishing a data connection with service provider 22 is included in, for example, a cellular modem that is employed as the data exchanger 20, which may be incorporated into router 10, as described above with respect to FIG. 2.

The router can also optionally include a limiter 40. Limiter 40 represents generally any combination of hardware and/or programming capable of distinguishing among the users of devices such as client devices 12, 14, and 16, and applying different internet access rules for different users. For example, certain internet access rules may apply to the owner of router 10. In this context, the term owner refers to an individual or entity that is a subscriber with respect to a service provider such as service provider 22 shown in FIGS. 1 and 2. The owner typically has physical possession or otherwise has control of router 10. Other internet access rules can apply to users authorized by the owner. Yet other internet access rules apply to anonymous users. Where network interface 30 provides for a wireless connection with client devices, a user of a particular client device might not be known by the owner. As such, internet access rules for such users may be quite limiting. The limiter 40 and operation thereof is discussed in greater detail in U.S. patent application Ser. No. 11/673,956, filed Feb. 12, 2007, in the name of Pat Sewall, et al., the disclosure of which is hereby incorporated by reference in its entirety. In an alternative embodiment, the router does not include a limiter.

Referring back to FIGS. 1 and 2, data exchanger 20 is capable of measuring characteristics of data communication that take place with the internet service provider 22 through the remote link 24. For example, as illustrated at 50, 52, and 54 of FIG. 4, these characteristics may include cellular signal strength of the remote link 24, geographical location of the data exchanger 20, data transfer rates through the data exchanger 20 and the current time. Alternatively, as shown at 56 of FIG. 4, router 10 is capable of measuring instantaneous or average data transfer rates related to client devices 12, 14, 16 communicating with the internet 26 via remote link 24 through the data exchanger 20.

In an embodiment, the router 10 can be configured to request the data exchanger 20 to provide the router 10 with the communication characteristics data on a scheduled periodic basis. In addition, the router 10 may also request the data exchanger 20 to measure and provide communication characteristics data when the router 10 is sending or receiving data through the data exchanger 20 while in the normal course of servicing the network needs of client devices 12, 14, 16. In response to a request from the router 10, the data exchanger 20 can send the data to the router 10, as shown at 58, 60 and 62 of the embodiment of FIG. 4. As shown at 64 and 66 of FIG. 10, the router 10 correlates the characteristic data from the data exchanger 20, with any measurements collected by the router 10, such as the data transfer rate, and stores the correlated data in local memory 42 of the router 10.

For example, the router can measure and/or collect, among other data, local network data transfer rates, number of users at any given time, types of communications, and local wireless signal strength. The data from the data exchanger and the data from the router can be correlated in time. Analysis of such data may be used to provide desired information regarding the network. For example, it may be possible to determine the cause of a high data transfer rate event on the cellular network, such as where multiple client devices of the router having simultaneously downloaded large data files, such as videos or music files. In another example, certain types of client requests can be correlated with a cellular network communication event that is problematic to the cellular network, thereby providing information regarding the cause of the problem.

Figure 4:
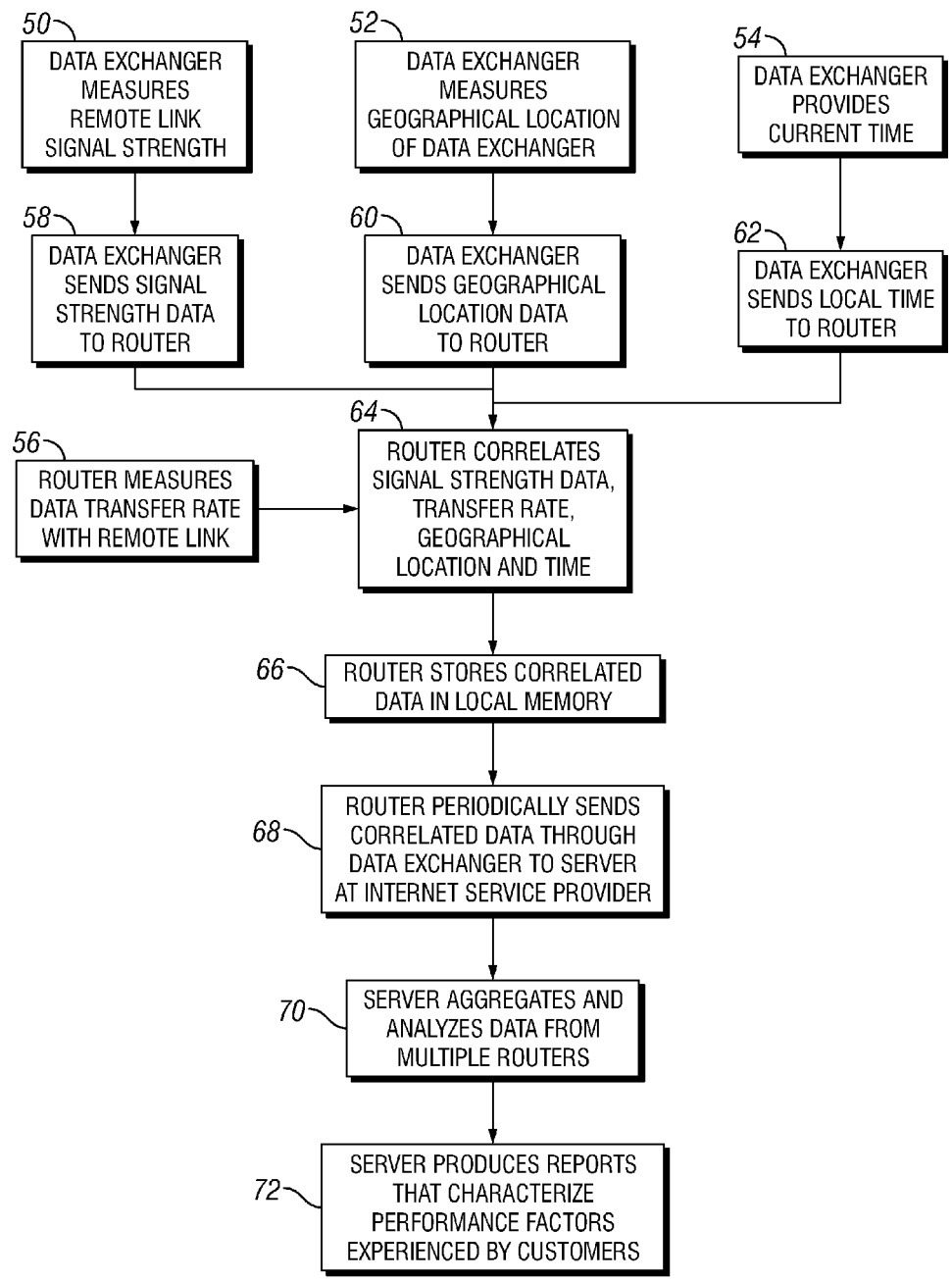
FIG. 4 is an exemplary flow diagram illustrating a process for carrying out various embodiments of the present disclosure.

On another periodic basis, as shown at 68 and 70 of FIG. 4, the router 10 can aggregate the correlated data and send the aggregated data to a database that resides on the server at the internet service provider 22. In other embodiments, the router 10 can send the data to any other entity that may desire the data, such as a cellular network service provider. Alternatively, the data can be communicated to service providers by any other suitable means.

The data can be employed by the service provider in any desired manner. For example, if the data is provided to a server of the internet service provider 22, the server can aggregate this data over time and from multiple routers, and analyze the data to characterize the performance of the internet service provider's network. Optionally, the server can produce reports that characterize performance factors experienced by the customers, as shown at 72 of FIG. 4.

For example, the characterization of the network may identify geographical locations with poor signal strength, or with poor data transfer rates. In another example, the characterization of the network may identify patterns in time when certain geographical locations have poor data transfer rates. In another example, the characterization of the network may identify underutilized areas of the network. This information may be used by the cellular providers to make long-term plans to alter the physical network, such as adding or removing network equipment, to provide improved service and cost-effective equipment utilization, to rerouting traffic, purchasing additional bandwidth from the available supply, or changing subscription programs in order to optimize revenue, or optimize network utilization.

Various modifications, alternatives and options can be made to the process illustrated in FIG. 4. For example, the router 10 may perform calculations, filtering or analysis of the characteristic data, and upload information regarding the data, which may include, for example, all or only a portion of the collected data, or the results of analysis, to the server. This can potentially reduce memory storage requirements of the router, save bandwidth on data transmission to the server and/or reduce memory requirements of the server. In one embodiment, the router 10 can analyze the data to determine if the data values are within normal parameters, and if so, send a message confirming the normal status to the server. The data can then be erased from the router without having ever been sent to the server. If the data is not within normal parameters, details regarding the data and/or all or a portion of the data itself can be sent to the server.

While portions of the process of FIG. 4 are illustrated as being carried out by the data exchanger and other portions as being carried out by the router, it is to be understood that the process is not so limited. Thus, the data exchanger can be designed to implement one or more of the processes illustrated as being performed by the router 10 and vice versa. In an embodiment, as shown in FIG. 2, the data exchanger may be an integral part of the router 10.

In an embodiment, the router 10 may be configured to periodically upload a standard test message to the server or download a standard test message from the server. In this manner, the router 10 can measure the data transfer rate on a scheduled basis, irrespective of activity initiated by client devices 12, 14, 16. Each of the described characteristics of data communication may be measured by the data exchanger 20 or the router 10.

The schematic diagrams of the figures illustrate exemplary environments in which embodiments of the present disclosure may be implemented. Implementation, however, is not limited to these environments. The diagrams of the figures show the architecture, functionality, and operation of various embodiments of the present disclosure. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present disclosure can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of the figures show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The present disclosure has been shown and described with reference to the foregoing exemplary embodiments. It is to be understood, however, that other forms, details and embodiments may be made without departing from the spirit and scope of the disclosure.

What is claimed is:

1. A method for collecting performance data that can be used to characterize the performance of a wireless communications system comprising at least one client device, a wireless routing device communicatively connected to the at least one client device, a data exchanger communicatively connected to the wireless routing device and an internet service provider, and the data exchanger being configured to connect the wireless routing device to the internet service provider, the method comprising:
    issuing a request from the wireless routing device to the data exchanger for performance data characterizing a wireless data communication that occurs between the internet service provider and the data exchanger, wherein the wireless routing device includes a memory, and is configured to route communications between the at least one client device and the internet service provider, via the data exchanger;
    receiving performance data at the wireless routing device in response to the request for performance data characterizing the wireless data communication;
    collecting the performance data with the wireless routing device;
    correlating the performance data using the wireless routing device; and
    storing the correlated data in the memory of the wireless routing device.

2. The method of claim 1, wherein issuing a request from the wireless routing device to the data exchanger for performance data characterizing a wireless data communication that occurs between the internet service provider and the data exchanger comprises issuing a request to measure a remote link signal strength of a signal received from the internet service provider.

3. The method of claim 1, wherein issuing a request from the wireless routing device to the data exchanger for performance data characterizing a wireless data communication that occurs between the internet service provider and the data exchanger comprises issuing a request to measure a geographical location of the data exchanger.

4. The method of claim 1, issuing a request from the wireless routing device to the data exchanger for performance data characterizing a wireless data communication that occurs between the internet service provider and the data exchanger comprises either the data exchanger or the wireless routing device providing the current time.

5. The method of claim 1, wherein issuing a request from the wireless routing device to the data exchanger for performance data characterizing a wireless data communication that occurs between the internet service provider and the data exchanger comprises the wireless routing device measuring a data transfer rate between a client device and the internet.

6. The method of claim 1, wherein the data exchanger is a separate device from the wireless routing device, the method further comprising the data exchanger determining at least a portion of the data and the wireless routing device requesting the at least a portion of the data from the data exchanger.

7. The method of claim 1, wherein the data exchanger is integrated as part of the wireless routing device.

8. The method of claim 1, further comprising the wireless routing device automatically initiating uploading or downloading of a test message from the internet at periodic intervals.

9. The method of claim 1, further comprising periodically sending information regarding the performance data to a remote server via the internet service provider.

10. The method of claim 9, wherein the wireless routing device performs an analysis of the performance data, and the information regarding the performance data comprises results of the analysis.

11. The method of claim 9, wherein the information regarding the performance data comprises at least a portion of the performance data.

12. A system for collecting performance data that can be used to characterize the performance of a wireless communications system, the system comprising:
    one or more client devices;
    a data exchanger configured to provide a remote link to an internet service provider; and
    a wireless routing device comprising a memory and being configured to route communications between the one or more client devices and an internet via the data exchanger, wherein the wireless routing device is configured to request performance data characterizing a wireless data communication that occurs between the data exchanger and an internet service provider, and further wherein the wireless routing device is configured to receive the performance data from the data exchanger in response to the request, collect the performance data, correlate the performance data, and store the correlated data in the memory of the wireless routing device.

13. The system of claim 12, wherein the data exchanger is configured to determine the performance data by measuring a remote link signal strength of a signal received from the internet service provider.

14. The system of claim 12, wherein the data exchanger is configured to determine a geographical location of the data exchanger.

15. The system of claim 12, wherein the wireless routing device is configured to measure a data transfer rate between at least one of the one or more client devices and the internet service provider.

16. The system of claim 12, wherein the data exchanger is a separate device from the wireless routing device.

17. The system of claim 16, wherein the data exchanger is a cellular phone.

18. The system of claim 12, wherein the data exchanger an integrated part of the wireless routing device.

19. A wireless router comprising:
    a local network interface configured to establish a communicative connection to one or more client devices, to allow communication with the one or more client devices, wherein communication with the one or more client devices comprises receiving communication data from the one or more client devices and transmitting communication data to the one or more client devices;
    a data transfer device communicatively coupled to the local network interface, via routing services, and configured to enable the exchange of communications data between the wireless router and an internet service provider, wherein the exchange of communications data comprises transmitting communication data from the one or more client devices to the internet service provider, and receiving communication data from the internet service provider directed to the one or more client devices; and the routing services being configured to receive routable communications from either the local network interface or the data transfer device and to direct the routable communications to an intended destination;

wherein the local network interface is configured to request performance data from the data transfer device, receive performance data from the data transfer device, correlate the performance data, and store the correlated data transfer device in a memory of the wireless router, the performance data characterizing a wireless data communication that occurs between the data transfer device and the internet service provider.

20. The wireless router of claim 19, wherein the data transfer device is a data exchanger interface operable to enable data to be communicated between the wireless router and a data exchanger that is separate from the wireless router.

21. The wireless router of claim 19, wherein the data transfer device is a data exchanger configured to be incorporated into the wireless router.

22. The wireless router of claim 19, wherein the data transfer device is a data exchanger that is integrated into the wireless router.

23. The wireless router of claim 19, wherein the performance data comprises at least one of (a) a remote link signal strength of a signal received from the internet service provider, (b) a geographical location of a data exchanger, (c) a current time, (d) a data transfer rate through the data exchanger, and (e) a data transfer rate between at least one of the one or more client devices and the internet service provider.

24. The wireless router of claim 19, wherein the wireless router is configured to measure a data transfer rate between at least one of the one or more client devices and the internet service provider.

25. The wireless router of claim 19, wherein the wireless router is configured to periodically send information regarding the communication data to a remote server via the internet service provider.

26. A non-transitory computer readable medium having computer executable instructions for:
  collecting performance data characterizing a wireless data communication that occurs between a data collection system and an internet service provider;
  correlating the performance;
  storing the correlated data; and
  periodically sending information regarding the correlated data to a remote server via the internet service provider.

27. The non-transitory computer readable medium of claim 26, wherein the performance data comprises at least one of a remote link signal strength of a signal received by a data exchanger from the internet service provider, a geographical location of a data exchanger, the current time, a data transfer rate through the data exchanger, and a data transfer rate between a client device and an internet.

28. The non-transitory computer readable medium of claim 26, wherein the computer readable medium further comprises computer executable instructions for measuring a data transfer rate between a client device and an internet.

29. The non-transitory computer readable medium of claim 26, wherein the information regarding the correlated data comprises at least a portion of the correlated data.

* * * * *